(12) United States Patent
Jun

(10) Patent No.: US 6,210,734 B1
(45) Date of Patent: Apr. 3, 2001

(54) SOFT UNPOLISHED RICE AND METHOD OF PREPARING THE SAME

(76) Inventor: Hak-Ju Jun, Keukdong Apt. 6-704, Kanseok 1-dong, Namdong-ku, Incheon (KR), 405-231

( * ) Notice: Subject to any disclaimer, the term of this patent is extended or adjusted under 35 U.S.C. 154(b) by 0 days.

(21) Appl. No.: 09/508,381
(22) PCT Filed: Sep. 9, 1998
(86) PCT No.: PCT/KR98/00275
 § 371 Date: Mar. 10, 2000
 § 102(e) Date: Mar. 10, 2000
(87) PCT Pub. No.: WO99/12433
 PCT Pub. Date: Mar. 18, 1999

(30) Foreign Application Priority Data

Sep. 11, 1997 (KR) .................................................. 97-46668

(51) Int. Cl.[7] ........................................................ A23L 1/00
(52) U.S. Cl. .................... 426/523; 426/462; 426/469; 426/507; 426/510
(58) Field of Search .................................. 426/523, 507, 426/510, 462, 469, 482

(56) References Cited

U.S. PATENT DOCUMENTS

| | | | |
|---|---|---|---|
| 4,308,295 | * | 12/1981 | Kuntz et al. .......................... 426/462 |
| 4,442,130 | * | 4/1984 | Autrey et al. ......................... 426/462 |
| 5,738,892 | * | 4/1998 | Takaoka ................................ 426/507 |

FOREIGN PATENT DOCUMENTS 917319 9/1991 (KR) .
9510199 9/1998 (KR) .

OTHER PUBLICATIONS

Patent Abstract of JP 59–63153 A.
Patent Abstract of JP 2–46262 A.
Abstract of JP 63091058 A.

* cited by examiner

*Primary Examiner*—George C. Yeung
(74) *Attorney, Agent, or Firm*—Baker Botts, L.L.P.

(57) ABSTRACT

Softened unpolished rice on which knurling patterns are formed is provided. The rice has pores and cracks formed on a rice bran. Furthermore, the method of preparing the same is provided.

6 Claims, 2 Drawing Sheets

SOFT UNPOLISHED RICE AND METHOD OF PREPARING THE SAME

BACKGROUND OF THE INVENTION (a) Field of the Invention

The present invention relates to soft unpolished rice and a method of preparing the same and, more particularly, to soft unpolished rice which has abundant nutritive substances, enables easy water-permeation, has good texture, and is easily digested.

(b) Description of the Related Art

The general rice grain (1) is shown in FIG. 1. As shown in FIG. 1, a most outer shell or hull (2), of the rice grain (1) is a fibrous cell including lignine and $SiO_2$, and is resistant to humidity, heat and cold. Under the hull (2), rice bran is formed. The rice bran is a hard, dense thin layer, and has hydrophobic properties. The rice bran includes pericarp (3), testa (4) and an aleurone layer (5). The rice grain (1) further includes an embryo (6) and an endosperm (7) having starch. It is from the embryo (6) that a new shoot or roots sprout.

Unpolished rice is prepared by removing the hull (2) from the rice grain (1), while polished rice is prepared by removing the hull (2) and the rice bran, and in some instance, even the embryo. The nutrient compositions of unpolished rice and polished rice are shown in Table 1. As shown in Table 1, the unpolished rice is rich in nutrients such as protein, lipid and mineral, more so than polished rice.

TABLE 1

[per 100 g]

|   | Nutrients | Unpolished rice | Polished rice |
|---|---|---|---|
| 1 | Protein | 7.2 g | 6.5 g |
| 2 | Lipid | 2.5 g | 0.4 g |
| 3 | Sacharride | 76.8 g | 77.5 g |
| 4 | Ash | 1.2 g | 0.5 g |
| 5 | Fiber | 1.3 g | 0.4 g |
| 6 | Calcium | 41 mg | 24 mg |
| 7 | Phosphorous | 284 mg | 147 mg |
| 8 | Iron | 2.1 mg | 0.4 mg |
| 9 | Magnesium | 120 mg | 50 mg |
| 10 | Vitamin $B_1$ | 0.54 mg | 0.12 mg |
| 11 | Vitamin $B_2$ | 0.006 mg | 0.003 mg |
| 12 | Nicotinic acid | 5.0 mg | 1.5 mg |
| 13 | Vitamin $B_0$ | 1.0 mg | 0.5 mg |
| 14 | Inositol | 120 mg | 10 mg |
| 15 | Choline | 110 mg | 60 mg |
| 16 | Benzoic acid | 32 mg | 14 mg |
| 17 | Vitamin K | 10 mg | 1 mg |
| 18 | Vitamin E | 1.0 mg | 0.2 mg |

Because unpolished rice includes THE rice bran, it is difficult for water to permeate the unpolished rice, thereby requiring a special cooker such as a pressure cooker to boil unpolished rice. Furthermore, due to the rice bran, the unpolished rice is hard to chew and digestibility of the same is low.

Korean patent publication No. 91-7319 discloses a method of preparing polished rice which can be easily boiled. In the method, unpolished rice is dipped into water, the rice is then dehydrated and the dehydrated rice is cooked. The dipping and dehydrating steps are repeated. Thereafter, the resulting rice is dried using hot air. The drying step is repeated three times, with a first drying step being performed at a high temperature, a second drying step at a low temperature, and a third drying step at a high temperature. When using this method, cracks occur in the rice bran (pericarp and testa).

However, the method has disadvantages in that the method is only applied to treat unpolished rice and is not applied to treat rice grain. In addition, the entire process is very complicated and as a result of the cracks in the rice barn, the nutrient content of the unpolished rice is reduced and cracks of the thin rice bran do not easily occur according to the temperature. Finally, as the drying step is repeated, the unpolished rice is somewhat degraded such that the taste and external appearance thereof are deteriorated.

A method to solve these problems is disclosed in Korean patent application No. 95-10199. In the method, rice grain or unpolished rice is dipped into water to germinate and the germinated rice is allowed to stand at a low temperature for a few days and the resulting rice is cooked to expend an endosperm. The hull at the rice grains is cracked as the rice is expanded. Thereafter, the cooked rice or unpolished rice is dried at room temperature to harden the endosperm. The dried rice is fed into a sheller having two rubber rollers, thereby removing the hull and cracking the rice bran.

However, only 60 to 70% of the hull is removed. To increase this, the removing step is repeated, and the rice is aged with steam and rolled. Furthermore, the aged and unpolished rice should be dried to a level of 20 to 23% moisture content in order to protect adherence thereof on a roller. Due to this step, the gelatinated endosperm comes to have elastic properties and thus the unpolished rice thinned by rolling, thickens again. Therefore, it is difficult to boil the rice, with the time required for boiling being extended.

SUMMARY OF THE INVENTION

It is an object of the present invention to provide softened unpolished rice of highly nutritive value and which is easily boiled.

It is another object to provide softened unpolished rice prepared by completely removing a hull with two knurling rollers having different rotative speeds.

It is still another object to provide softened unpolished rice having good water-permeability, taste and digestibility owing to a knurling pattern (unevenness) formed thereon.

It is still another object to provide a method of preparing softened unpolished rice with knurling rollers having different rotative speeds.

These and other objects may be achieved by a method of preparing unpolished rice. The method includes the steps of dipping a rice grain into water of 25 to 35° C. for 12 to 24 hours to germinate the rice grain, and cold-storing the germinated rice at −1 to 5° C. for 1 to 5 days. The cold-stored rice is the cooked at 90 to 110° C. for 30 to 35 minutes, dried with hot air to 20 to 23% of moisture content, then fed to two knurling rollers having different rotative speeds and rolling the rice to remove a hull and expand the rice bran. The method further includes the steps of spray-coating a dispersed solution to the rolled rice and fermenting the coated rice at 25 to 35° C. for 6 to 12 hours to soften the rice bran and an endosperm of the unpolished rice, and heating the softened unpolished rice with hot air of 200 to 300° C. for 5 to 10 minutes to carbonize the rice bran. The dispersed solution is prepared by adding sugar, raw milk and bean flour to yeast or cellulase.

In the case of using unpolished rice as raw material, 30 to 35° C. of water is used.

BRIEF DESCRIPTION OF THE DRAWINGS

A more complete appreciation of the invention, and many of the attendant advantages thereof, will be readily apparent

DETAILED DESCRIPTION OF THE INVENTION

The present invention provides unpolished rice being capable of easily boiling and having soft taste and good digestibility.

The unpolished rice preparation method will be described in more detail by each step.

Step 1: Enzymatic Degradation and Cold-Storage of Rice Grain or Unpolished Rice Rice grain or unpolished rice is dipped into water of 25 to 35° C. for 12 to 24 hours, and the water is decanted to remain at 30 to 42 wt % of water based on the amount of rice. At this time, the rice is germinated and enzymatic degraded. According to these steps, moisture content of the rice is increased from 5 to 22 wt % to 30 to 42 wt %. When conditions such as temperature, humidity and oxygen, etc. are appropriate, a period of dormancy of the rice grain or unpolished rice ceases and the rice absorbs at least 27% of water and begins to germinate.

Germination generally refers to a state where a sprout is revealed from the grain to grow a primary leaf or radicle. The germination process generally includes an initiating step, a generating step and a growing step. In the present invention, the germination process only includes the initiating step and generation step. In the initiating step, various enzymes generate and serve to hydrolyze the nutrients such as starch, protein and lipid included in an endosperm and an embryo. When hydrolyzed, protein is degraded into amino acid by protease, starch is degraded into saccaharide by diastase and lipid is degraded into glycerin or fatty acid by lipase.

The degraded nutrients are used for growing the sprout or a root during the growing step of the general germination process. On the other hand, in he present invention, the germination process does not include the growing step and thus the use of the degraded nutrients can be prevented.

In the present invention, the germinated rice is cold-stored at a low temperature of −1 to −5° C. for 1 to 5 days. In this case, for preventing the rice from freezing and dying, the physiological action of the rice occurs, and thus the enzymatic degradation becomes more active and the rice becomes fresher. The germination is found by carefully observing the rice. In case of using unpolished rice, less time is required for germinating compared to rice grain.

Step 2: Cook and Dry

The cold-stored rice is cooked at 90 to 110° C. for 30 to 35 minutes in a cooker tank by injecting steam, while rotating. As the cooker tank, any cylindrical cooker tank which can be rotated and injected with steam may be used. The tank includes shaking wings attached on the inner side of the tank.

Figure 3:
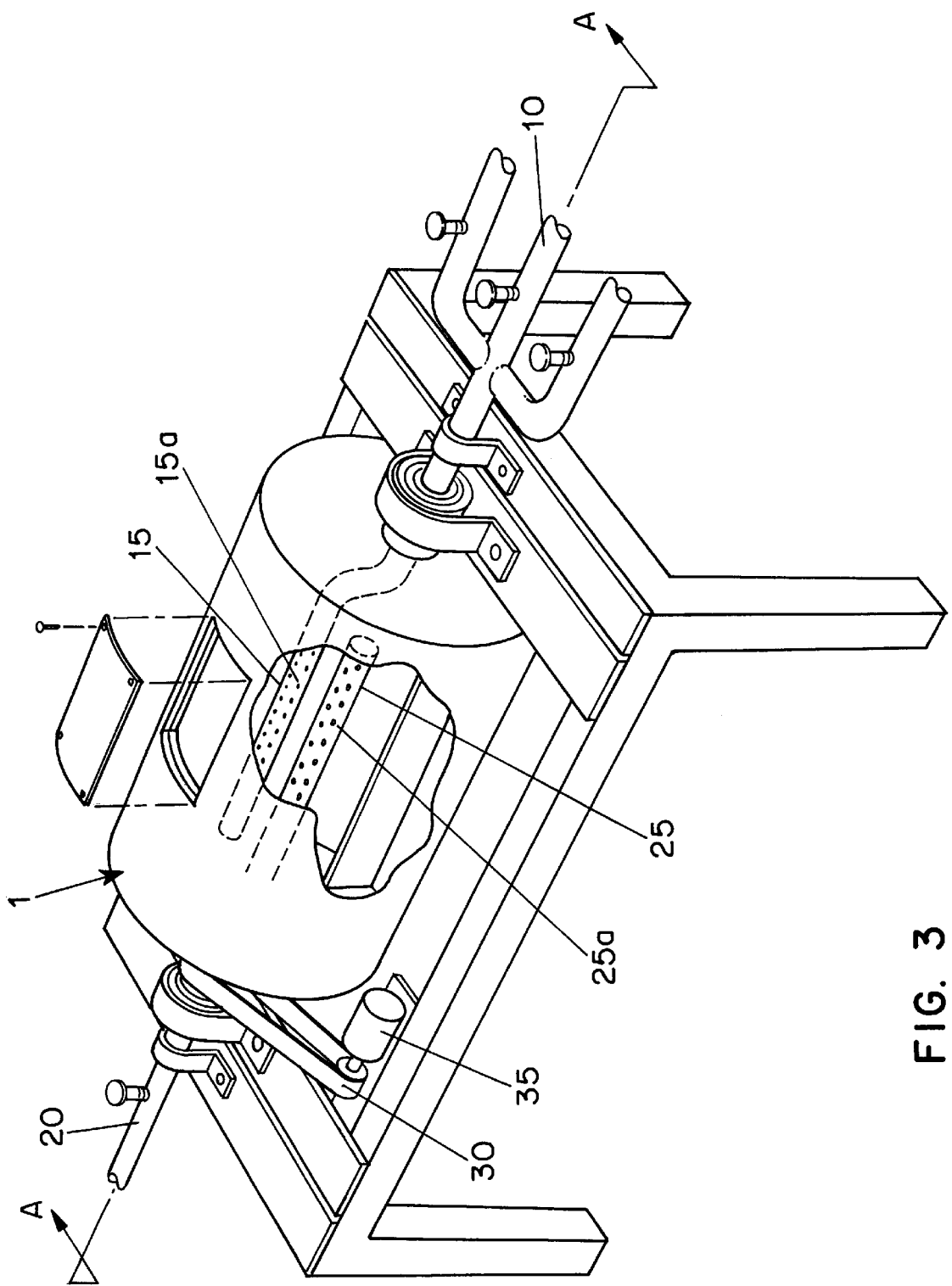
FIG. 3 is a perspective view showing a cooking tank used in the cooking step of the present invention.

The exemplary of the tank is shown in FIG. 3. In FIG. 3, the reference numeral 1 denotes a cylinder. On both external sides of the cylinder 1, steam-injected pipes 10 and 20 are attached. The steam-injected pipes 10 and 20 are respectively joined with steam-sprayed pipes 15 and 25 which are located on the cylinder and is sprayed steam onto the inner of cylinder. The steam-sprayed pipes 15 and 25 include a plurality of hole 15a and 25a thereon. Through the hole 15a and 25a, steam is sprayed from the steam-injected pipes 10 and 20 to the cylinder 1. Furthermore, the cylinder 1 includes shaking wings thereon. The cylinder is rotated by belt 30 and operation motor 35.

The rotative speed of the tank is set to 10 to 50 RPM. Because the shaking and the cooking steps are simultaneously performed, the rice is uniformly cooked and has a uniform moisture content.

By cooking the rice, the moisture content of the cold-stored rice is decreased to 28 to 30 wt % from 30 to 42 wt %. Thereafter, the rice is further dried with hot air to decrease the moisture content of the same to 20 to 23 wt %. In this step, the smell of the rice grain soaks into inner portions of the rice, and physical properties of the endosperm of the rice is changed to become elastic such that the endosperm and the hull are expanded. As the expansion speed of the endosperm is faster than the hull, cracks occur in the hull.

Furthermore, during the hot-air drying step, the endosperm is shrunk, while the hull does not experience not shrinkage. Owing to the difference of shrinkage, a gap is formed between the endosperm and hull. The gap enables the hull to be easily removed in a subsequent step.

The gelatinized endosperm is changed to elastic endosperm by hot air and thus adherence between rice particles due to the endosperm gelatin can be protected in a rolling step with a knurling roller.

Step 3: Remove and Roll

The dried rice is fed between two metal knurling rollers of a sheller and rolled to remove the hull.

Rubber and metal rollers are generally used in a sheller. The metal roller is preferred because it has a longer life span. However, when the removing step of the conventional unpolished rice is performed by the metal roller, the unpolished rice is ground because the general unpolished rice does not have elasticity. Therefore, to prevent grinding of the rice, the rubber roller is conventionally used in the removing step. However, in the present invention, the metal roller is used for removing hull from the unpolished rice, since the unpolished rice of the present invention has elasticity properties.

Furthermore, in the present invention, as the metal roller, a knurling roller formed with knurling patterns is used to completely remove hull layer from the rice. The distance between the two knurling rollers is preferably 0.25 to 0.5 mm, but there is no limitation to this range.

Figure 1:
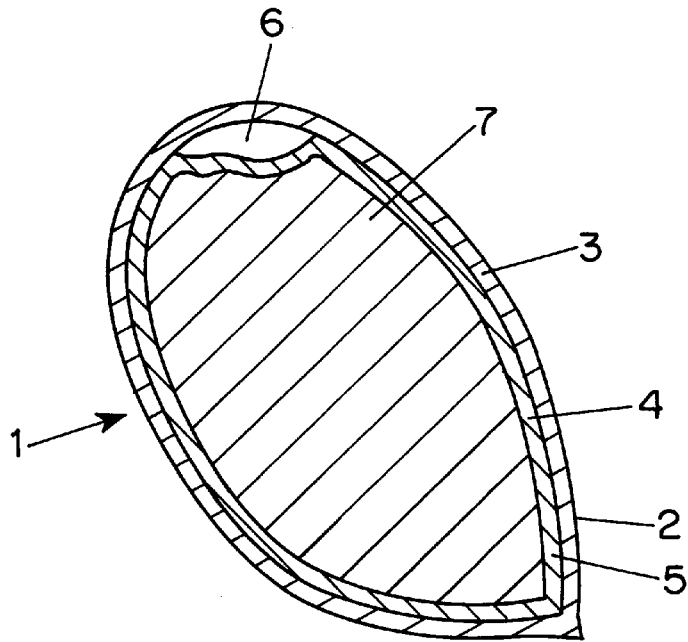
FIG. 1 is a side cross sectional view showing the conventional rice grain.
Figure 2:
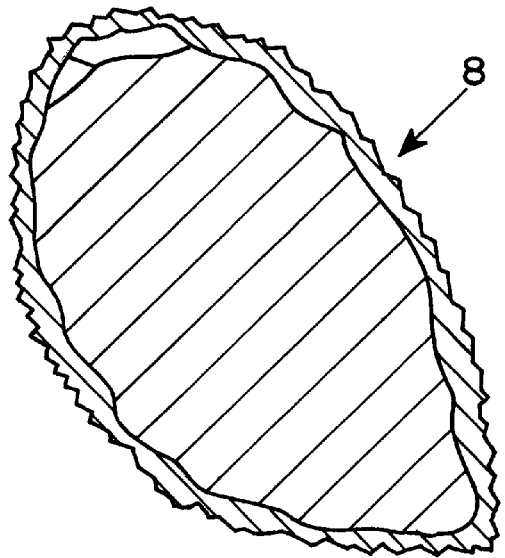
FIG. 2 is a side cross sectional view showing rice grain of the present invention.

According to the above-described step, if rice grain is used, the hull is easily removed owing to the gap formed between the endosperm and hull, and pores and cracks on the rice bran appear. In addition, if unpolished rice is used, the surface of the unpolished rice is torn and knurling patterns are formed on the surface by rolling with the knurling roller. That is, the pores and cracks appearing on the rice bran and the unpolished rice thinned by rolling do not thicken again. FIG. 2 shows the unpolished rice of the present invention on which the knurling patterns 8 are formed.

Owing to the pores and cracks formed on the rice bran, water easily permeates during boiling so that the boiled rice is soft. Furthermore, the boiled rice digests well.

Step 4: Cleaning

The rolled rice is cleaned by a cleaner to remove unneeded and foreign materials such as pieces of the hull.

Step 5: Fermentation

The cleaned rice is fermented by yeast or cellulase to soften the rice bran and endosperm layers, and improve taste and digestibility.

The preferred fermentation is that a dispersed solution having high viscosity is sprayed on and mixed with the cleaned rice. The dispersed solution is prepared by adding sugar, raw milk and bean flour to yeast or cellulase. In this case, the rice is coated with milk and bean flour. This can prevent the removed of the rice bran layer from the rice and increase the nutrient value of the rice. This poses no problem to those that can not digest milk, as lactase is naturally generated, when digesting the rice coated with milk.

Step 6: Carbonization and Dry

The fermented rice is fed to a cylindrical drier and dried to obtain 15 to 18% of moisture content of the rice by hot air. Thereafter, hot air of 200 to 300° C. is flowed into the drier for 5 to 10 minutes, and the drier is then shaken, thereby obtaining yellowish rice. Cold air of 10 to 15° C. is flowed to the drier to lower the temperature remove moisture therefrom. At this time, a bitter smell of the rice is removed and the rice is sterilized. Furthermore, the resulting rice is sweet and soft, and has a moisture content of 12 to 13%.

The present invention is further explained in more detail with reference to the following examples.

EXAMPLE 1

50 kg of rice grain was dipped into water of 25 to 35° C. for 24 hours in a tank until the moisture content of the rice grain was at least 27 wt %. The water was decanted to obtain 30 to 42 wt % of the amount of water based on the total weight of rice. At this time, the rice grain was germinated.

While the germinated rice was kept in the tank, temperature of the tank was lowered to −3 ° C. and the rice was cold-stored for 3days. After 3 days, the stored rice was cooked by flowing steam at 90 to 100° C. for 30 minutes. Accordingly, the moisture content of 39 to 42 wt % of rice grain decreased to 28 to 30 wt %. The rice was dried to have a moisture content of about 20 to 23% by removing the remaining heat with hot air. By observation, it was found that cracks on the hull occur. Moreover, it was found that fine gaps formed between the rice bran and hull by removing the cracked hull layer with hands.

The dried rice is regularly-fed to a sheller with two knurling rollers, and rolled. It is preferably that the sheller has the following diameter and length to increase production and allow enough time to the rice between the knurling rollers.

The diameter of the roller (on which knurling patterns is formed) is 120 cm and the length of roller is 150 cm. The rotative speed of the roller is 30 RPM when rotating clockwise, in the case of a fixed roller, and 25 RPM when rotting in counter-clockwise in case of a handling roller. The distance between the rollers is set to 0.25 to 0.5 mm and the number of knurling patterns (unevenness) is 24 to 34 inches. However, the length, diameter, rotative speed and number of knurling patterns are not limited to these ranges.

As a result of rolling, the hull was easily removed, the hull-removed unpolished rice became flat, and was formed with knurling patterns and cracks on the surface. When the rice is rolled, endosperms are not adhered with each other or on the roller. The rolled rice is cleaned by using a cleaner to remove foreign materials such as removed hulls and broken rice from the unpolished rice.

EXAMPLE 2

50 kg of unpolished rice was fed to a water tank maintained at 35° C. While water in the tank was replaced at an interval of 12 hours, the rice was allowed to stand in the water tank for 24 hours. 24 hours after rice allowed to stand, water was removed from the tank to facilitate germination.

While the germinated rice was kept in the tank, the temperature of the tank was lowered to −3° C. and stored for 3 days. Thereafter, steam of 90 to 110° C. was injected into the tank to cook the rice. Here, the moisture content of 39 to 42% of unpolished rice was reduced 28 to 30% by heat. Thereafter, the rice was dried by hot air to remove the residual heat, and to obtain rice having a moisture content of 20 to 23%.

The dried rice was rolled by using a roller with two knurling rollers under the same condition of Example 1 except that the distance between the two knurling roller was 0.2 to 0.3 mm.

The foreign material was removed from the rolled rice and fermentation and carbonization were performed under the same condition of Example 1, thereby obtaining softened unpolished rice having a moisture content of 11%.

EXAMPLE 3

40 kg of a softened unpolished rice was prepared by the same procedure in Example 1 except that 0.2 wt % of cellulase was sprayed onto the cleaned rolled rice, while shaking, and fermented at 35° C. for 5 hours.

The unpolished rice of Examples 1 and 2 was boiled for 30 minutes by using an electric rice cooker. The conventional unpolished rice was dipped into water for 5 hours and boiled for 25 minutes by using a pressure cooker. The organoleptic methods of boiled rice were performed and the results are shown in Table 2. As shown in Table 2, the rice of the present invention is sweet and the taste thereof is soft and it is easy to chew. The conventional rice is also sweet, but it is difficult to chew and the taste is bad.

TABLE 2

| | | Example 1 | Example 2 | Conventional rice |
|---|---|---|---|---|
| The removal of a bitter smell | Excellent | 10 | 10 | |
| | Good | | | 5 |
| | Bad | | | 5 |
| Texture | Excellent | 10 | 10 | |
| | Good | | | |
| | Bad | | | 10 |
| Taste | Excellent | 10 | 10 | |
| | Good | | | |
| | Bad | | | 10 |
| The taste of rice cooked without pressure | Excellent | 10 | 10 | |
| | Good | | | |
| | Bad | | | 10 |

As described above, the softened unpolished rice prepared by the method of present invention has a high nutrient value and the texture thereof is very good. Furthermore, it is easy to boil the rice of the present invention.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing unpolished rice comprising:
    dipping a rice grain into water of 25 to 35° C. for 12 to 24 hours to germinate the rice and cold-storing the germinated rice at −1 to −5° C. for 1 to 5 days;
    cooking the cold-stored rice at 90 to 110° C. for 30 to 35 minutes;
    drying the cooked rice with hot air to obtain 20 to 23% of moisture content;
    feeding the dried rice to two knurling rollers having different rotative speeds and rolling the rice to remove a hull of the rice and expand a rice bran of the rice;
    spray-coating a dispersion to the rolled rice and fermenting the coated rice at 25 to 35° C. for 6 to 12 hours to soften the rice bran and an endosperm of the unpolished rice; and
    heating the fermented rice with hot air of 200 to 300° C. for 1 to 5 minutes to carbonize the rice bran.

2. The method of claim 1 wherein the cooking step is performed using a cylindrical cooking tank which is capable of rotating, and is injected with steam.

3. The method of claim 1 or 2 wherein the cylindrical cooking tank has shaking wings.

4. The method of claim 1 wherein the fermenting step is performed by spraying a dispersion onto the rolled rice and shaking the rice, the dispersion being prepared by adding sugar, milk and soybean flour to yeast or cellulose.

5. A softened unpolished rice prepared by claim 1, wherein a knurling pattern and cracks are formed on the rice, and the rice has moisture content of 11 to 13%.

6. A method of preparing unpolished rice comprising the steps of:
    dipping a rice grain into water of 25 to 35° C. for 12 to 24 hours to germinate the rice and cold-storing the germinated rice at −1 to −5° C. for 1 to 5 days;
    cooking the cold-stored rice at 90 to 110° C. for 30 to 35 minutes using a cylindrical cooking tank which is capable of rotating, is injected with steam and has stirring wings; drying the cooked rice with hot air to obtain 20 to 23% of moisture content;
    feeding the dried rice to two knurling rollers having different rotative speeds and rolling the rice to remove a hull of the rice and expand a rice bran of the rice;
    spray-coating a dispersion to the rolled rice and fermenting the coated rice at 25 to 35° C. for 6 to 12 hours to soften the rice bran and an endosperm of the unpolished rice; and
    heating the fermented rice with hot air of 200 to 300° C. for 1 to 5 minutes to carbonize the rice bran.

* * * * *